J. W. Dart. W. & H. Webster.
6621X
Flour Mill.
Patented July 20. 1831.
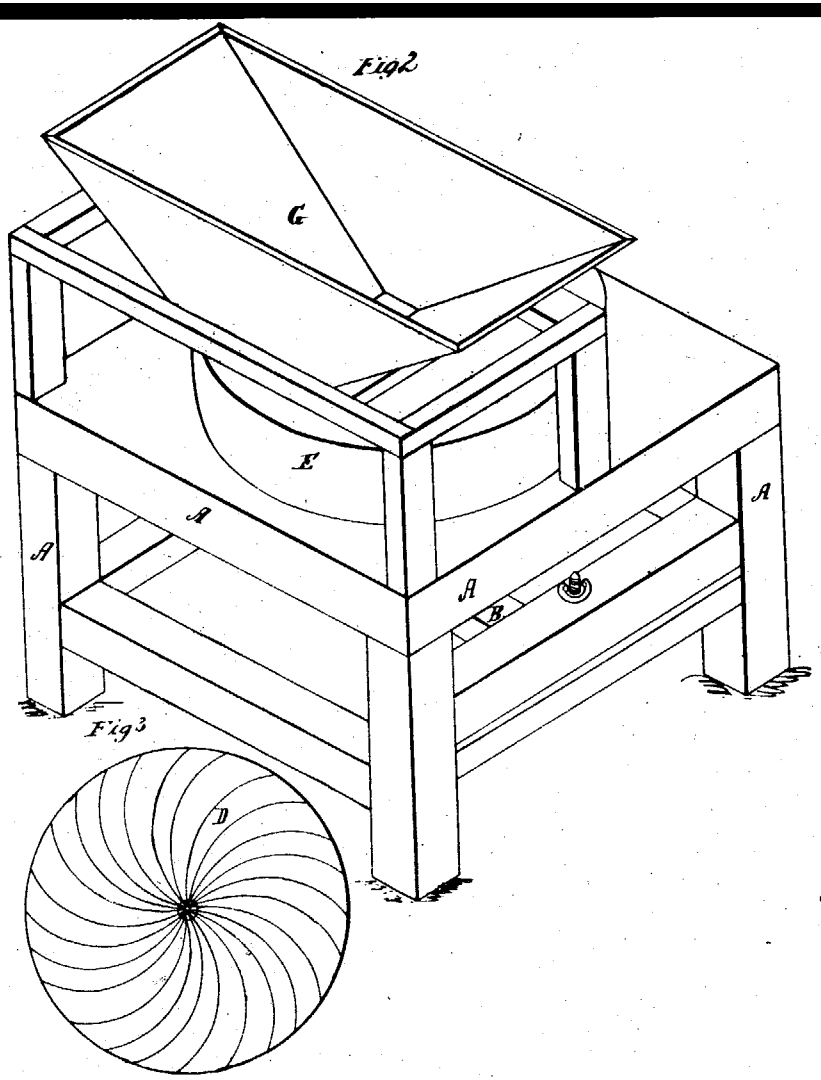
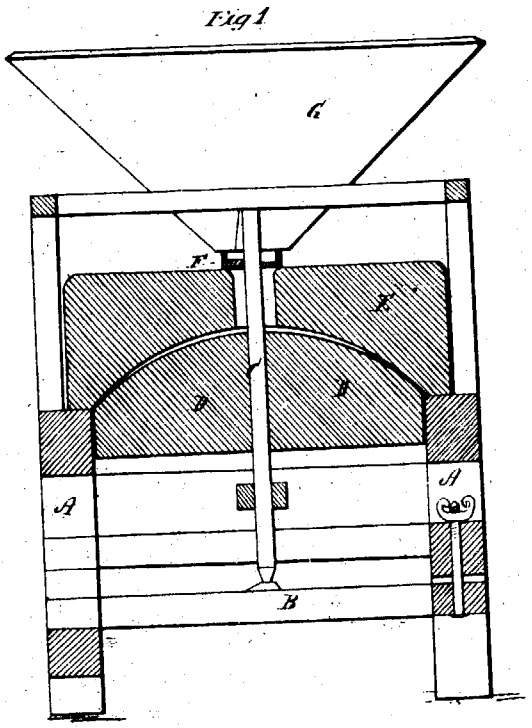

6621x July 20, 1831

Jehiel W. Dart. Willard Webster and Hiram Webster . Trenton . New York — Letters Patent The Schedule referred to in these Letters Patent and making part of the same containing a description in the words of the said Jehiel W. Dart. Willard Webster and Hiram Webster themselves of their improvement in the Grist mill.

Be it known that We Jehiel W. Dart Willard Webster and Hiram Webster of Trenton County of Courtlandt and State of New York have made an improvement in mills for grinding grain which is described as follows.

The frame is made of four posts framed together by two girts on each side of the frame. A piece of timber called the bridge tree or Mill beam is tenoned into or rests on the centre of two of the lower girts. One of the two girts on which rests the mill beam is moveable to set the stones for fine or coarse grinding — In addition to the above mentioned girts there is one above the moveable girt for the purpose of fastening the frame together & to receive a bolt running through the moveable girt and through the above mentioned girt with a nut and screw on the top for the purpose of raising the mill beam. The size of the timber varying with the size of the Mill, and the height is sufficient to receive the Stones gearing and curb. The hopper and shoe are made in the usual way the cap is stationary and rests on the upper girts and is fastened down by bolts of iron running through the girts on which it rests with an angle or clasp on the upper end, a nut & screw on the lower end, or by a bar of iron or wood across the top of the cap and fastened down to the girts at each end. The cavity in the cap is made in a circling form to receive the grinding surface of the runner hereafter described. The runner is a flat surface on the bottom running up in a straight line on the sides two inches or more. then the grinding surface rises in a circling form from one eighth to three eighths of the diameter of the runner in the centre. The runner & cap are both Drawing 6621x July 20, 1831 made of stone and the medium diameter of the runner for grinding grain
is about sixteen inches although not limited. The spindle or shaft running
through the centre of the runner being fastened to it and of sufficient length
below to reain the curb and geering through and above the cap two
inches or more for the purpose of keeping the runner in the centre &
shaking the shoe. said spindle runs in a box placed on or in the mill
beam and runs through a box at the top of the cap. or in a bar of
iron or wood. said boxes are both moveable to centre the runner &
plumb the spindle. — This mill may be put in motion by water
or any known power by means of a strap and pulley or cog wheel placed
on the shaft or spindle — The mill being put in motion the grain enters
at the opening in the cap near the spindle and runs into the
furrows which are carried any direction required and is ground and
carried off in the usual way — The invention hereby claimed is the
cheapness of the construction of the mill, the grinding surface as before
described and in lessening the usual power for grinding In testimony that the foregoing is a true description of our inven
tion we have subscribed our names before two witnesses & made oath
to the same this second day of June 1831.

Exd Witnesses
[illegible] Abraham Hart
Edmund Harris

Ashiel M. Daet
Willard Webster
Hiram Webster

[637 [illegible]]